United States Patent [19]
Purcell et al.

[11] Patent Number: 6,071,867
[45] Date of Patent: *Jun. 6, 2000

[54] CLEANING COMPOSITIONS AND METHODS OF USING THE SAME

[75] Inventors: Karen Purcell, Greensboro, N.C.; Charles L. Hawes, Summerville, S.C.; David R. Harry, Jr., Oak Ridge; Gerald E. La Cosse, Greensboro, both of N.C.

[73] Assignee: Kay Chemical Company, Greensboro, N.C.

[ * ] Notice: This patent is subject to a terminal disclaimer.

[21] Appl. No.: 08/912,793

[22] Filed: Aug. 18, 1997

Related U.S. Application Data

[63] Continuation of application No. 08/342,037, Nov. 17, 1994, Pat. No. 5,691,289.

[51] Int. Cl.[7] .................................. C11D 3/44; B08B 7/00
[52] U.S. Cl. ........................ 510/174; 510/240; 510/242; 510/405; 510/407; 510/417; 510/432; 510/461; 510/505; 510/506; 134/38; 134/39; 134/40
[58] Field of Search ..................................... 510/174, 240, 510/242, 405, 407, 417, 432, 461, 505, 506; 134/38, 39, 40

[56] References Cited

U.S. PATENT DOCUMENTS

| | | |
|---|---|---|
| 2,705,207 | 3/1955 | Stevens . |
| 3,915,880 | 10/1975 | Sepulveda . |
| 3,950,185 | 4/1976 | Toyama et al. . |
| 3,954,648 | 5/1976 | Belcak et al. . |
| 4,085,059 | 4/1978 | Smith et al. . |
| 4,125,476 | 11/1978 | Dean . |
| 4,276,186 | 6/1981 | Bakos et al. . |
| 4,294,729 | 10/1981 | Bakos et al. . |
| 4,350,605 | 9/1982 | Hughett . |
| 4,414,128 | 11/1983 | Goffinet . |
| 4,426,250 | 1/1984 | Brailsford . |
| 4,511,483 | 4/1985 | Ogawa et al. . |
| 4,518,518 | 5/1985 | Koch . |
| 4,533,487 | 8/1985 | Jones . |
| 4,537,705 | 8/1985 | Mahoney et al. . |
| 4,617,251 | 10/1986 | Sizensky . |
| 4,619,706 | 10/1986 | Squires et al. . |
| 4,640,719 | 2/1987 | Hayes et al. . |
| 4,643,840 | 2/1987 | Brocklehurst et al. . |
| 4,749,510 | 6/1988 | Nelson . |
| 4,764,222 | 8/1988 | Colegrove . |
| 4,780,235 | 10/1988 | Jackson . |
| 4,812,255 | 3/1989 | Suwala . |
| 5,006,279 | 4/1991 | Grobbel et al. . |
| 5,098,591 | 3/1992 | Stevens . |
| 5,112,516 | 5/1992 | Koetzle . |
| 5,124,062 | 6/1992 | Stevens . |
| 5,156,760 | 10/1992 | Marchese et al. . |
| 5,167,853 | 12/1992 | Stevens . |
| 5,288,335 | 2/1994 | Stevens . |
| 5,298,184 | 3/1994 | Jarema . |
| 5,332,526 | 7/1994 | Stanley . |
| 5,334,331 | 8/1994 | Fusiak . |
| 5,346,640 | 9/1994 | Leys . |
| 5,372,742 | 12/1994 | Bayless . |
| 5,604,195 | 2/1997 | Misselyn et al. .................. 510/400 |
| 5,641,742 | 6/1997 | Adamy et al. ..................... 510/500 |

FOREIGN PATENT DOCUMENTS

| | | |
|---|---|---|
| 0 604 372 A1 | 6/1994 | European Pat. Off. . |
| WO 91/00893 | 1/1991 | WIPO . |

*Primary Examiner*—Lorna M. Douyon
*Attorney, Agent, or Firm*—Finnegan, Henderson, Farabow, Garrett & Dunner, L.L.P.

[57] ABSTRACT

Cleaning compositions are disclosed that economically and effectively remove a variety of marking materials from many coated or uncoated substrate surfaces. The compositions contain a terpene compound, a pyrrolidone compound, an emulsifying surfactant, and water, the compositions being in the form of a microemulsion. Also disclosed are methods of cleaning marked surfaces with the microemulsion compositions.

17 Claims, No Drawings

CLEANING COMPOSITIONS AND METHODS OF USING THE SAME

This is a continuation of application Ser. No. 08/342,037, filed Nov. 17, 1994 now U.S. Pat. No. 5,691,289.

BACKGROUND OF THE INVENTION

This invention relates generally to cleaning compositions and methods. More particularly, this invention relates to microemulsion cleaning compositions that effectively and economically remove markings from surfaces and to methods of using the microemulsion compositions. The compositions and methods are effective to remove a wide variety of marking materials from many substrate surfaces without damage to or alteration of the surfaces, their coatings, or adjacent areas. While this invention is subject to a wide range of applications, it is especially suited for removing graffiti and will be described particularly in that connection.

The removal of markings from various surfaces has been of interest for a long time. The restoration of the original appearance of inadvertently or intentionally marked surfaces can present considerable problems. More recently, there has been increased concern in removing undesired markings known as graffiti, which are defacements in the form of words or figures on walls and other surfaces of public and private places. In part due to proliferation and availability of aerosol paint sprays, ink marking devices, and other marking means, it has proven difficult to avoid defacement of surfaces by graffiti.

Removing graffiti is difficult because of the great variety of marking materials, many of which are inherently difficult to remove. These marking materials include paints, inks, marking pens, ballpoint pens, lipstick, shoe polish, nail polish, permanent markers, chalk, and crayon.

Consistent removal of markings made by these materials is complicated by the variety of substrate surfaces on which the markings are made. These surfaces include acrylic, aluminum, anodized aluminum, brick, ceramics, concrete, Corian™, enameled surfaces, formica, glass, grout, marble, Marlite™, metals, plastic, polycarbonate (Lexan™), plexiglass, polyethylene, polysulfone, quarry tile, stainless steel, stone, tile, and wood. Some surfaces are porous, and the markings may penetrate the pores, making removal even more difficult. In addition, metals and other substrate surfaces may have a coating or other finish which has been defaced by the markings.

Graffiti has become prevalent in many public and private institutions, buildings, and places such as restaurants, schools, school buses, automobiles, trucks, trains, libraries, rest rooms, and other places accessible to the public at large. Graffiti is also problematic in open areas and on public works, such as support walls, piers, bridges, retaining walls, sound barriers, exterior building walls, sculptures, and other structures found in parks, highways, and open spaces.

Perhaps the most common way of removing graffiti is to repaint or recoat the surface. This approach is perhaps the least effective and least economical. Repainting a surface is costly and labor intensive. It requires using a paint capable of covering and masking the graffiti without the graffiti bleeding through the overcoat. Often several coats are required. Moreover, this method is often undesirable because it destroys the desired original finish of many surfaces.

Other methods for removing graffiti have included sandblasting, hydrosanding, or hydroblasting. These methods also are costly and because of their abrasive nature often damage the substrate surface or its coating, making it porous and rough. This etching or scoring of the surfaces or their coatings creates a degree of porosity that helps hold graffiti applied later to the surface, as well as to areas in close proximity to the originally marked area. Like repainting, these methods cannot be used for surfaces where maintaining an original finish characteristic is desired. Further, sandblasting emits potentially carcinogenic siliceous particles into the air.

Still other methods and compositions for removing graffiti involve the use of chemical removing agents, such as acids or caustics. These agents also frequently damage or destroy the defaced surfaces. For example, chemical agents are known to etch, fog, or melt many common surfaces. Use of these compositions often must be for limited periods of time or not over an extended period of time to avoid permanent damage to the surface being cleaned. Highly acid and caustic compositions also present an unreasonable health and safety risk to the persons using or otherwise exposed to these compositions.

Still other widely used cleaning compositions include a volatile organic chemical solvent base, particularly halogenated solvents such as methylene chloride. The high volatility of these solvents leads to high evaporation losses, risks ignition of the organic vapors, and causes contamination of the environment. These compositions also are highly objectionable due to their extreme toxicity, particularly from inhalation or exposure. Many chlorinated hydrocarbons, including methylene chloride, are suspected carcinogens. The hazardous nature of these chemicals is well-documented in the literature, and it is clear that a safe, non-toxic alternative is required.

Accordingly, there is a great need for cleaning compositions that are economical, that effectively remove a wide variety of marking materials from many surfaces with minimal damage to the substrate surfaces or their protective coatings, and that minimize safety and environmental hazards.

SUMMARY OF THE INVENTION

The present invention is directed to improved cleaning compositions and methods that effectively and economically remove a wide variety of marking materials from a wide variety of uncoated and coated substrate surfaces with no or negligible effect to the substrates or their coatings. The present compositions are easily applied to substrate surfaces, fast acting, and easily rinsed or otherwise removed from the substrate surfaces with water or an aqueous solution, thus avoiding the often difficult labor associated with prior compositions and methods. Further, the present compositions are relatively non-toxic and present a reduced health risk from exposure to the skin, eyes, and mucous membranes. The compositions of this invention also are relatively non-volatile, reducing the safety hazards associated with volatile vapors.

Additional features and advantages of the invention will be set forth in the description that follows and, in part, will be apparent from the description or may be learned by practice of the invention. The objectives and other advantages of this invention will be realized and attained by the compositions and methods particularly pointed out in the following written description, examples, and claims.

To achieve these and other advantages, and in accordance with the purpose of this invention as embodied and described herein, the invention is a microemulsion cleaning composition that includes a terpene compound, a pyrrolidone compound, a surfactant effective to form a microemulsion, and water.

In another aspect, the present invention is a method for removing marking materials from a substrate surface that includes applying to the surface a microemulsion cleaning composition that includes a terpene compound, a pyrrolidone compound, a surfactant effective to form a microemulsion, and water. In this aspect, the invention further includes contacting the marking material with the composition for a sufficient time for the composition to solubilize the marking material, followed by removing the composition and the marking material with water or an aqueous solution.

It is to be understood that the foregoing general description and the following detailed description are exemplary, explanatory, and intended to provide further explanations of the invention as claimed.

DETAILED DESCRIPTION OF THE INVENTION

The compositions of the present invention contain a terpene compound, preferably about 1% to about 60% by weight, more preferably about 5% to about 40% by weight, and even more preferably about 10% to about 20% by weight, of a terpene or terpene compound. As used herein, the terms terpene and terpene compound refer to a class of acyclic and cyclic unsaturated compounds derived from the isoprene molecule and having at least 10 carbon atoms. However, terpenes that find use in the present invention also include terpene alcohols and aldehydes as well as unsaturated terpene hydrocarbons. Any number of compounds, including combinations of terpenes, can be used in the present invention.

Terpene compounds for use in the present include alpha-pinene, beta-pinene, citronellal, citronellol, 3,7-dimethyl-octanol, d-limonene, delta 3-carine, gamma-terpinene, hydroxycitronellal, linalool, p-menthane, terpinerol, and tetrahydrolinalool, among others, with cyclic terpenes being preferred. Other preferred terpenes for use in compositions of the present invention include Solvenol™ 226 terpene by Hercules, Inc. and Glidsol™ 190, Limonene™ 125, Limonene™ 135, and Limonene™ 145 terpenes by Glidco Organics Corp. Solvenol™ 226 terpene by Hercules, Inc. is a terpene solvent mixture having as its major components by weight 34% to 40% trans-p-menthane, 12% to 15% p-cymene, 10% to 15% dipentene, 8% to 10% alpha-pinene, 6% to 10% beta-pinene, 3% to 4% camphene, and 2% to 5% alpha-terpinene Glidsol™ 190, Limonene™ 125, Limonene™ 135, and Limonene™ 145 terpenes sold by Glidco Organics Corporation are mixtures of various isomers of terpene (C10) hydrocarbons, primarily isomers of p-menthadiene. In addition, the Glidsol™ 190 terpene contains aromatic terpene hydrocarbons.

Compositions of the present invention also contain a pyrrolidone compound, preferably about 1% to about 60% by weight, more preferably about 5% to about 40% and even more preferably about 10% to about 20% by weight, of a pyrrolidone compound. As used herein, the term pyrrolidone compound refers to a class of cyclic compounds including and derived from 2-pyrrolidinone, 3-pyrrolidinone, or pyrrolidine, unsubstituted or substituted at the ring nitrogen or one or more of the ring carbons.

As described and claimed herein, the nitrogen of the pyrrolidone ring may be unsubstituted or substituted with alkyl groups. A preferred pyrrolidone compound for this invention is N-methylpyrrolidone, a highly polar, water-miscible solvent that is miscible with many conventional organic solvents. Other solvents similar to N-methylpyrrolidone in solubility and solvent power may be used in the present invention, and may include structural analogues of N-methylpyrrolidone, for example N-ethylpyrrolidone and N-propylpyrrolidone, among other solvents. However, as the number of carbon atoms within the N-substituted moiety increases beyond 3 (propyl), water miscibility of the pyrrolidone decreases. In addition, such substitution may affect the solvent power of the pyrrolidone compound used.

In addition to nitrogen substitution, the carbon atoms of the pyrrolidone ring may also be substituted. These substituted compounds are less preferred for use in this invention than N-methylpyrrolidone because of cost and the reduced polarity caused by their substitutions. For example, N,5-dimethyl-2-pyrrolidone and 3,3-dimethyl-2-pyrrolidone may be used in the present invention, but are less preferred than is N-methylpyrrolidone.

The 2-keto group of N-methylpyrrolidone is not a requirement for the pyrrolidone compound of the present invention and certain pyrrolidone analogs, for example, N,2-dimethylpyrrolidine, 2,4-dimethylpyrrolidine, 2,5-dimethylpyrrolidine, and N-methyl-pyrrolidine, among others, may be used in this invention. Pyrrolidone and pyrrolidine compounds that may be used in the present invention may be less polar than N-methylpyrrolidone, necessitating adjustment to the amount and type of surfactant and/or terpene compound used.

The compositions of the present invention also include a surfactant effective to form a microemulsion, preferably about 1% to about 35% by weight, more preferably about 5% to about 20% by weight, and even more preferably about 10% to about 15% by weight, of a surfactant effective to form a microemulsion, selected from nonionic, cationic, anionic, or amphoteric surfactants. As used herein, the phrase "surfactant effective to form a microemulsion" refers to at least one such nonionic, cationic, anionic, or amphoteric surfactant.

Examples of nonionic surfactants that can be employed are alkoxylated alkyl phenols, amides, amines, ethoxylated or propoxylated higher aliphatic alcohols, and sulphonamides. These well known surfactants include sorbitan esters of $C_{10}$ to $C_{22}$ fatty acids, polyoxyethylene sorbitan esters of $C_{10}$ to $C_{22}$ fatty acids, polyoxyethylene sorbitol esters of C 10 to $C_{22}$ fatty acids, polyoxyethylene derivatives of $C_6$ to $C_{20}$ fatty phenols, and polyoxyethylene condensates of $C_{10}$ to $C_{22}$ fatty acids or fatty alcohols. Polyoxyethylene and polyoxypropylene analogs of the above surfactants also can be used in the present invention. Preferred nonionic surfactants for use in this invention are Shell Neodol™ 91-6 and Shell Neodol™ 91-2.5 surfactants. Neodol™ 91-6 surfactant is a polyethylene glycol ether of a mixture of synthetic C9-1 1 fatty alcohols with an average of 6 moles of ethylene oxide. Neodol™ 91-2.5 surfactant is a polyethylene glycol ether of a mixture of a synthetic C9-1 1 fatty alcohols with an average of 3 moles of ethylene oxide.

Other suitable nonionic surfactants include sorbitol monolaurate propylene oxide condensates, sorbitol monomyristate propylene oxide condensates, sorbitol monostearate propylene oxide condensates, dodecyl phenol propylene oxide condensates, myristyl phenol propylene oxide condensates, octylphenyl propylene oxide condensates, nonlyphenyl propylene oxide condensates, stearyl phenol propylene oxide condensates, lauryl alcohol propylene oxide condensates stearyl alcohol propylene oxide condensates, secondary alcohol propylene oxide condensates such as $C_{14}$–$C_{15}$ secondary alcohols condensed with propylene oxide, sorbitan tristearate condensed with propylene oxide, sorbitan trioleate condensed with propylene oxide, and sorbitan trioleate.

Cationic surfactants useful in this invention include, e.g., the quaternary ammonium surfactants such as $C_{10}$ to $C_{22}$ fatty ammonium compounds having 10 to 22 carbon atoms, $C_{10}$ to $C_{22}$ fatty morpholine oxides, propylene oxide condensates of $C_{10}$ to $C_{22}$ fatty acid monoesters of glycerins, the mono- or diethanol amides of $C_{10}$ to $C_{22}$ fatty acids, and alkoxylated siloxane surfactants containing propylene oxide units and/or propylene oxide units. As is known in the surfactant art, the counter ion for quaternary ammonium surfactants is usually a halide, sulfate, or methylsulfate, the chlorides being the most common industrially available compounds.

Other suitable cationic surfactants suitable for use in the present invention include straight chain alkyl fatty amines, quaternary ammonium salts, alkyl-substituted quaternary ammonium salts, alkylaryl-substituted quaternary ammonium salts, quaternary imidazolinium salts, amine oxides, fatty amine oxides, tri-fatty amine oxides, tri-quaternary phosphate esters, amphoglycinate phosphates, amine acetates, long chain amines and their salts, diamines and their salts, polyamines and their salts, polyoxyethylenated long chain amines, and quaternized polyoxyethylenated long chain amines.

Specific cationic surfactants useful in the present invention include decyl dimethyl amino oxide, coco amido dimethyl amine oxide, trimethyl dodceyl ammonium chloride, and trimethyl stearyl ammonium methylsulfate. Particularly preferred cationic surfactants include the surfactant sold under the trademark Q-17-2™ and the AO-3,8™ surfactant by the Exxon Chemical Company, Varisoft™ 222 and Arosurf™ TA-100 surfactants by the Witco Chemical Company, and Ninox L™ surfactant by the Stepan Chemical Company. Q-17-2™ surfactant by the Exxon Chemical Company is a 75% by weight aqueous solution of isotridecyloxypropyl dihydroxyethyl methyl ammonium chloride. The Exxon AO-3,8™ surfactant is a proprietary tertiary eight-carbon amine oxide. The Varisoft™ 222 surfactant is a diamidoamine-based quaternary with a formula of methyl bis (tallow amidoethyl) 2-hydroxyethyl ammonium methyl sulfate. The Arosurf™ TA-100 surfactant is a dialkyl dimethyl quaternary with the chemical composition of distearyl dimethyl ammonium chloride. The Ninox-L™ surfactant is a lauryl dimethylamine oxide.

Anionic surfactants useful in this invention generally include alkali metal, ammonium and magnesium salts of alpha olefin sulfonates, alkyl sulfonates, alkyl aryl sulfonates, alkyl aryl ether sulfates, alkyl ether sulfates, sulfated alcohol ethoxylates, taurates, petroleum sulfonates, alkyl napthalene sulfonates, alkyl sarcosinates and the alkyl sulfosuccinates.

Specific anionic surfactants useful in this invention include sodium lauryl sulfonate, ammonium lauryl sulfonate, dodecyl benzene sulfonate, sodium lauryl ether sulfate, diethanolamine lauryl sulfate, ammonium salts of sulfated alcohol ethoxylates, sodium cocoyl isethionate, sodium N-methyl-N-oleoyl taurate, sodium N-methyl-N-cocyl taurate, triethanolamine lauryl sulfate, disodium monooleamide PEG-2 sulfosuccinate, petroleum sulfonates sodium salt, alkyl napthalene sodium sulfonates, sodium lauroyl sarcosinate, and sodium alkyl sulfosuccinate. Other useful anionic surfactants include sodium or potassium dodecyl sulfate, sodium trioleate, sodium or potassium stearyl sulfate, sodium or potassium dodecyl benzene sulfonate, sodium or potassium stearyl sulfonate, triethanol amine salt of dodecyl sulfate, sodium laurate, sodium or potassium myristate, and sodium or potassium stearate.

Amphoteric surfactants useful in this invention generally include betaines, sultaines, imidazoline derivatives and the like. Specific amphoteric surfactants useful in this invention include ricinoleamidopropyl betaine, cocamidopropyl betaine, stearyl betaine, stearyl amphocarboxy glycinate, sodium lauraminopropionate, cocoamidopropyl hydroxy sultaine, disodium lauryliminodipropionate, tallowiminodipropionate, cocoamphocarboxy glycinate, cocoimidazoline carboxylate, lauric imidazoline monocarboxylate, lauric imidazoline dicarboxylate, lauric myristic betain, cocoamidosulfobetaine, alkylamidophospho betain and the like. Other useful amphoteric surfactants include decyl amino betaine; coco amido sulfobetaine, oleyl amido betaine, coco imidazoline, coco sulfoimidazoline, cetyl imidazoline, 1-hydroxyethyl-2-heptadecenyl imidazoline, 1-hydroxyethyl-2 mixed heptadecenyl heptadecadienyl imidazoline, and n-coco morpholine oxide. Preferred amphoteric surfactants include Miranol™ FBS surfactant by Rhone-Poulenc and Mackalene™ 316 surfactant by the McIntyre Chemical Company. The Miranol™ FBS surfactant is a 39% by weight aqueous solution of disodium cocoampho dipropionate. The Mackalene™ 316 surfactant is a stearamidopropyl dimethylamine lactate.

The foregoing compounds have been described with particular reference to fatty derivatives. It is the fatty moiety that usually forms the lipophilic moiety. A common fatty group is an alkyl group of natural or synthetic origin. In most instances, the alkyl group may be replaced by the corresponding ethylenically saturated group having one or more ethylene linkages such as commonly occur in nature. Common unsaturated groups are oleyl, linoleyl, decenyl, hexadecenyl, dodecenyl, etc. In appropriate cases, as known in the art, the alkyl group may be cyclic, i.e., cycloalkyls, or may be straight or branched chain.

Any combination of nonionic, cationic, anionic, or amphoteric surfactants can be used in the present invention. It may be preferable in certain embodiments of the present invention to include a mixture of surfactants. In all embodiments, the surfactant selected is effective to form a microemulsion in the final composition.

The compositions of this invention further include water, preferably at least about 20%, more preferably about 25% to about 60% by weight, and even more preferably about 40% to about 50% by weight, of water. Water is critical to the formation of the microemulsion compositions of this invention. Further, water increases the solubility of the present compositions and thus enhances their removal after application to a marked substrate. It is to be understood by one of ordinary skill in the art that the other components, particularly the emulsifying surfactant, may require adjustment to accommodate a given water concentration and to result in formation of a microemulsion composition.

Compositions of the present invention may also include a solvent extender or a combination of solvent extenders, preferably about 5% to about 20% by weight, and more preferably about 10% to 15% by weight, of a solvent extender or combination of solvent extenders. The solvent extender in the present invention functions either or both to enhance solubility characteristics or to raise the flash point of the compositions. In addition, the solvent extenders used in the present invention may be useful for forming the microemulsions of the present invention.

The microemulsion cleaning compositions of the present invention have a flash point of at least about 105° F. by virtue of the amount and type of solvent extender added to the compositions. Preferred solvent extenders for use in the present invention have a flash point of at least about 150° F. Typical solvent extenders for use in the present invention include small chain alcohols, e.g. ethanol and isopropanol, alkylene carbonates, e.g. ethylene carbonate, propylene carbonate and butylene carbonate, and glycols and glycol ethers.

Glycols useful as solvent extenders in the compositions of the present invention include ethylene glycol, propylene glycol and butylene glycol, among others. Useful glycol ethers include diethyleneglycolmonobutylether, diethyleneglycolmonoethylether, diethyleneglycolmonohexylether, diethyleneglycolmonomethylether, diethyleneglycolmonopropylether, dipropyleneglycolmonobutylether, dipropyleneglycolmonomethylether, dipropyleneglycolmonopropylether, ethoxylpropyleneglycolmonobutylether, ethyleneglycolmonoethylether, ethyleneglycolmonohexylether, ethyleneglycolmonomethylether, ethyleneglycolmonobutylether, ethyleneglycolmonopropylether, propyleneglycolmonobutylether, propyleneglycolmonomethylether, propyleneglycolmonopropylether, propyleneglycolmono-t-butylether, triethyleneglycolmonoethylether, triethyleneglycolmonomethylether, triethyleneglycolmonopropylether, and tripropyleneglycolmonomethylether, among others. Preferred solvent extenders are propylene glycol, hexylene glycol, and propylene glycol monomethyl ether because of their favorable flash points as well as their general safety and lack of toxicity.

The pH of the cleaning compositions of the present invention can vary from highly acidic to highly alkaline within the range of about 2.0 to about 12.0. Preferred embodiments of the cleaning compositions of the present invention have a pH within the range of about 5.5 to about 8.0, preferably within the range of about 6.0 to about 8.0. Adjustment of pH in the present compositions to desired levels can be accomplished by methods well known to the art, such as, for example, by addition of alkali earth carbonates or hydroxides, or by addition of inorganic or organic acids.

The preparation of the microemulsion compositions of the invention is not critical, and the compositions of the invention are prepared easily by any one of numerous methods known to those skilled in the art. All that is required is a suitable vessel to hold the components and a simple mixing means effective to bring the combined ingredients into a microemulsion form. A suitable apparatus for preparing the compositions of this invention would be a stainless steel tank furnished with a conventional, paddle-type mixer. Generally, the ingredients can be added to the vessel in any order. Mixing should continue until the product becomes a stable, clear microemulsion. The microemulsion compositions of the invention give rise to no separation, coalescence, crystallization, or sedimentation on storage.

To remove unwanted markings on smooth, non-porous surfaces, the present compositions are sprayed, brushed, or wiped onto the affected area. A preferred method of application is a light spray. After application, the cleaning composition is allowed to stand at least several seconds to permit solubilization of the marking material. The composition and marking material then are wiped or rinsed off with a dry or damp paper towel, cloth, or sponge, or by a stream or spray of water or other aqueous solution. As used in describing and claiming the step of removing the compositions and marking material according to the methods herein, the term water refers to both water and aqueous solutions. To remove unwanted markings from porous surfaces, the present compositions are applied in the manners described above, again, preferably by a light spray. The compositions then preferably are brushed into the surface and allowed to stand for several seconds, followed by rinsing with a stream or spray of water or other aqueous solution.

EXAMPLES

GRAFFITI REMOVER FORMULAS

In the following Examples 1–17, the compositions were prepared by adding the ingredients in the order listed to a glass beaker equipped with a magnetic stirring bar. After each ingredient was added, the beaker contents were mixed thoroughly to form a uniform composition. In each example a microemulsion was obtained that was clear, fluid, and stable when tested under a temperature cycle of 25° F. to 120° F.

Example 1

| Ingredients | Concentration w/w % |
| --- | --- |
| N-methylpyrrolidone | 14.3 |
| Solvenol 226 | 14.3 |
| Propylene Glycol Monomethyl Ether | 7.2 |
| Hexylene Glycol | 5.1 |
| Q-17-2 ™ | 1.6 |
| Neodol ™ 91-2.5 | 6.2 |
| Neodol ™ 91-6 | 6.2 |
| H₂O | 45.1 |

Example 2

| | |
| --- | --- |
| N-methylpyrrolidone | 20.0 |
| Solvenol 226 | 20.0 |
| Propylene Glycol Monomethyl Ether | 9.5 |
| Neodol ™ 91-6 | 0.5 |
| Triethanolamine | 5.0 |
| Oleic Acid | 10.0 |
| H₂O | 35.0 |

Example 3

| | |
|---|---|
| N-methylpyrrolidone | 19.0 |
| Solvenol 226 | 19.0 |
| Propylene Glycol Monomethyl Ether | 9.5 |
| Q-17-2 ™ | 2.8 |
| Neodol ™ 91-2.5 | 8.1 |
| Neodol ™ 91-6 | 8.1 |
| H$_2$O | 33.5 |

| | | | | |
|---|---|---|---|---|
| N-methylpyrrolidone | 14.8 | 13.9 | 13.3 | 13.4 |
| Solvenol 226 | 14.8 | 13.9 | 13.3 | 13.4 |
| Propylene Glycol Monomethyl Ether | 7.4 | 7.0 | 6.7 | 6.8 |
| Hexylene Glycol | 5.3 | 4.9 | 4.7 | 4.8 |
| Q-17-2 ™ | 0.5 | 0.5 | 1.5 | — |
| Neodol ™ 91-2.5 | 5.3 | 4.1 | 4.6 | 9.6 |
| Neodol ™ 91-6 | 5.3 | 12.1 | 13.9 | 9.6 |
| H$_2$O | 46.6 | 43.6 | 42.0 | 42.4 |

| | | | | |
|---|---|---|---|---|
| N-methylpyrrolidone | 13.7 | 14.0 | 11.5 | 12.5 |
| Solvenol 226 | 13.7 | 14.0 | 11.5 | 12.5 |
| Propylene Glycol Monomethyl Ether | 6.9 | 7.0 | 5.8 | 6.3 |
| Hexylene Glycol | 4.9 | 5.0 | 4.1 | 4.4 |
| Q-17-2 ™ | — | 2.9 | — | — |
| Neodol ™ 91-2.5 | 4.5 | 6.5 | 23.1 | — |
| Neodol ™ 91-6 | 13.3 | 6.5 | 7.7 | 25.0 |
| H$_2$O | 43.0 | 44.1 | 36.3 | 39.3 |

Example 12

| | |
|---|---|
| N-methylpyrrolidone | 14.1 |
| Solvenol 226 | 14.1 |
| Propylene Glycol Monomethyl Ether | 7.1 |
| Hexylene Glycol | 5.0 |
| Arosurf ™ TA-100 | 1.6 |
| Neodol ™ 91-2.5 | 6.7 |
| Neodol ™ 91-6 | 6.7 |
| H$_2$O | 44.7 |

Example 13

| | |
|---|---|
| N-methylpyrrolidone | 14.3 |
| Solvenol 226 | 14.3 |
| Propylene Glycol Monomethyl Ether | 7.2 |
| Hexylene Glycol | 5.1 |
| Varisoft ™ 222 | 1.6 |
| Neodol ™ 91-2.5 | 3.7 |
| Neodol ™ 91-6 | 3.7 |
| H$_2$O | 50.1 |

Example 14

| | |
|---|---|
| N-methylpyrrolidone | 14.3 |
| Solvenol 226 | 14.3 |
| Propylene Glycol Monomethyl Ether | 7.2 |
| Hexylene Glycol | 5.1 |
| Mackalene ™ 316 | 1.6 |
| Neodol ™ 91-2.5 | 4.6 |
| Neodol ™ 91-6 | 4.6 |
| H$_2$O | 48.3 |

Example 15

| | |
|---|---|
| N-methylpyrrolidone | 14.3 |
| Solvenol 226 | 14.3 |
| Propylene Glycol Monomethyl Ether | 7.2 |
| Hexylene Glycol | 5.1 |
| Arosurf ™ TA 100 | 0.5 |
| Neodol ™ 91-2.5 | 5.0 |
| Neodol ™ 91-6 | 5.0 |
| H$_2$O | 48.6 |

Example 16

| | |
|---|---|
| N-methylpyrrolidone | 14.3 |
| Solvenol 226 | 14.3 |
| Propylene Glycol Monomethyl Ether | 7.2 |
| Hexylene Glycol | 5.1 |
| Ninox ™ L | 1.6 |
| Neodol ™ 91-2.5 | 2.5 |
| Neodol ™ 91-6 | 2.5 |
| H$_2$O | 52.5 |

Example 17

| | |
|---|---|
| N-methylpyrrolidone | 14.3 |
| Solvenol 226 | 14.3 |
| Propylene Glycol Monomethyl Ether | 7.2 |
| Hexylene Glycol | 5.1 |
| Miranol ™ FBS | 1.6 |
| Neodol ™ 91-2.5 | 2.8 |
| Neodol ™ 91-6 | 2.8 |
| H$_2$O | 51.9 |

Example 18

GRAFFITI REMOVER TEST—PERFORMANCE AND EFFECT ON SURFACE

This table summarizes the performance and effect on substrate surface of the composition of Example 1 tested on a variety of marking materials and substrates. The composition was used in accordance with the methods described above in the specification for use of the present compositions to remove markings from porous and non-porous surfaces.

TABLE

| Surface Description | Graffiti Type | Performance | Effect on Surface |
|---|---|---|---|
| Painted dumpster | Red spray paint | Complete removal | Abrasive |
| Concrete wall | White spray paint | Only shadow left | Discolored |
| Brick wall | White spray paint | Only shadow left | Discolored |

TABLE-continued

| Surface Description | Graffiti Type | Performance | Effect on Surface |
|---|---|---|---|
| Painted cement | Gray spray paint | Complete removal | None |
| Wallpaper | Blue pen | Complete removal | None |
| Grout lines | Ballpoint pen | Complete removal | None |
| Ceramic tiles | White marker | Complete removal | None |
| Quarry tile | Glue | Complete removal | None |
| Ceramic tile | Color markers | Complete removal | None |
| Marble store front | Black marker | Complete removal | None |
| Table tops | Various markers | Complete removal | None |
| Painted gate | Black spray paint | Only shadow left | None |
| Brick | Spray paint | Only shadow left | None |
| Polished granite | Various markers | Complete removal | None |
| White sink | Black marker | Complete removal | None |
| White wall | Marker | Complete removal | None |
| Ceramic tile | Black marker | Complete removal | None |
| Table | Blue pen | Complete removal | None |
| Grout lines | Black marker | Complete removal | None |
| Air freshener | Marker | Complete removal | None |
| Painted door | Grey spray paint | Complete removal | None |
| Glass | Gold spray paint | Complete removal | None |
| Mirror | Black marker | Complete removal | None |
| Plastic seating | Silver marker | Complete removal | None |
| Aluminum window frame | Silver marker | Complete removal | None |
| Porcelain sink | Blue marker | Complete removal | None |
| Pay phone | Assortment | Complete removal | None |
| Polished marble | Black spray paint | No removal | None |
| Brick wall | Dark spray paint | Only shadow left | None |
| Rest room wall | Black marker | Only shadow left | None |
| Glass door | Black spray paint | Complete removal | None |
| Ceramic tiles | Blue marker | Complete removal | None |
| Mirrors | Black marker | Complete removal | None |
| Seating | Black marker | Complete removal | None |
| Ceramic tile wall | White marker | Complete removal | None |
| Stainless door frame | Black marker | Complete removal | None |
| Plastic air freshener | Gold marker | Complete removal | None |
| Brown painted surface | Black marker | Complete removal | None |
| Chain link fence | Silver spray paint | Complete removal | None |
| Bathroom doors | Gold spray paint | Complete removal | None |
| Painted door | Black spray paint | Complete removal | None |
| Seating | Ballpoint pen | Complete removal | None |
| Brick wall | Black marker | Complete removal | None |
| Brick wall | Black marker | Only shadow left | None |
| Rest room wall | White marker | Complete removal | None |
| Quarry tile baseboard | Silver marker | Complete removal | None |
| Brick wall | Various paints | Complete removal | None |
| Wallpaper | Black marker | Only shadow left | None |
| Entryway frame | Marker | Complete removal | None |
| Baby changer table | Black/green marker | Only shadow left | None |
| Trash can | Spray paint | Complete removal | None |
| Brick wall | Black spray paint | Only shadow left | None |
| Block wall | Black spray paint | No removal | None |
| Dumpster | Gold spray paint | Complete removal | None |
| Natural wood | Red spray paint | Slight removal | None |
| Pay phone booth | Black marker | Complete removal | None |
| Garbage pail | Red spray paint | Complete removal | None |
| Painted door | Black marker | Complete removal | Remove paint |
| Painted metal door | Brown spray paint | Only shadow left | Remove paint |
| Wallpaper | Black marker | Complete removal | Slight abra. |
| Painted door | Black marker | Complete removal | Softened paint |

It will be apparent to those skilled in the art that various modifications and variations can be made in the composition and method of the present invention without departing from the spirit or scope of the invention. Thus, it is intended that the present invention cover the modifications and variations of this invention provided they come within the scope of the appended claims and their equivalents.

We claim:

1. A microemulsion cleaning composition comprising:
   a. about 1% to about 60% by weight of a terpene compound;
   b. about 1% to about 60% by weight of a pyrrolidone compound;
   c. about 1% to about 35% by weight of a surfactant effective to form a microemulsion;
   d. 9.5% to about 20% by weight of the solvent extender selected from the group consisting of small chain alcohols, alkylene carbonates, monoglycols, and glycol ethers, with the proviso that the solvent extender is not ethyleneglycolmonobutylether; and
   e. at least about 20% by weight water.

2. The microemulsion cleaning composition according to claim 1 comprising:
   a. about 5% to about 40% by weight of the terpene compound;
   b. about 5% to about 40% by weight of the pyrrolidone compound;
   c. about 5% to about 20% by weight of the surfactant effective to form a microemulsion;
   d. 9.5% to about 20% by weight of the solvent extender; and
   e. about 25% to about 60% by weight water.

3. A microemulsion cleaning composition according to claim 2, comprising:
   a. about 10% to about 20% by weight of the terpene compound;
   b. about 10% to about 20% by weight of the pyrrolidone compound;
   c. about 10% to about 15% by weight of the surfactant effective to form a microemulsion;
   d. 9.5% to about 20% by weight of the solvent extender; and
   e. about 40% to about 50% by weight water.

4. A microemulsion cleaning composition according to claim 3, comprising from about 10% to about 15% by weight of the solvent extender.

5. A microemulsion cleaning composition according to claim 3, wherein the surfactant effective to form a microemulsion comprises a nonionic surfactant and a cationic surfactant.

6. A microemulsion cleaning composition according to claim 3, wherein the pyrrolidone compound is N-methylpyrrolidone.

7. A microemulsion cleaning composition according to claim 4, wherein the solvent extender comprises propylene glycol, hexylene glycol, and propylene glycol monomethyl ether.

8. A microemulsion cleaning composition according to claim 2, wherein said composition has a flash point of at least about 105° F.

9. A microemulsion cleaning composition according to claim 2, wherein said composition has a pH of about 2.0 to about 12.0.

10. A microemulsion cleaning composition according to claim 6, wherein said composition has a pH of about 5.5 to about 8.0.

11. A microemulsion cleaning composition according to claim 7, wherein said composition has a pH of about 6.0 to about 8.0.

12. A microemulsion cleaning composition comprising:
   a. about 10% to about 20% by weight of a terpene compound;
   b. about 10% to about 20% by weight of N-methylpyrrolidone;
   c. about 10% to about 15% by weight of a surfactant effective to form a microemulsion, said surfactant comprising a nonionic surfactant and a cationic surfactant;
   d. about 40% to about 50% by weight of water; and
   e. about 10% to about 15% by weight of a solvent extender comprising propylene glycol monomethyl ether and hexylene glycol;
said composition having a flash point of at least 105° F. and a pH of about 6.0 to about 8.0.

13. A method for removing markings from a surface comprising:
   a. applying to a marking material on a substrate surface a microemulsion cleaning composition comprising:
      i. about 1% to about 60% by weight of a terpene compound;
      ii. about 1% to about 60% by weight of a pyrrolidone compound;
      iii. about 1% to about 35% by weight of a surfactant effective to form a microemulsion;
      iv. 9.5% to about 20% by weight of a solvent extender selected from the group consisting of small chain alcohols, alkylene carbonates, monoglycols, and glycol ethers, with the proviso that the solvent extender is not ethyleneglycolmonobutylether; and
      v. at least about 20% by weight water;
   b. contacting the marking material with said microemulsion composition for a period of time sufficient to solubilize said marking material; and
   c. removing from said surface said composition and said marking material with water.

14. A method for removing markings from a surface according to claim 5, wherein the terpene compound ranges from about 5% to about 40% by weight, the pyrrolidone compound ranges from about 5% to about 40% by weight, and the surfactant ranges from about 5% to about 20% by weight, the solvent extender ranges from 9.5% to about 15% by weight, and the water ranges from about 25% to about 60% by weight.

15. A method for removing markings from a surface according to claim 5, wherein the terpene compound ranges from about 10% to about 20% by weight, the pyrrolidone compound ranges from about 10% to about 20% by weight, and the surfactant ranges from about 10% to about 15% by weight.

16. A method for removing markings from a surface according to claim 15, wherein the cleaning composition comprises from about 10% to about 15% by weight of a solvent extender.

17. A method for removing markings from a surface according to claim 16, wherein:
   a. the surfactant effective to form a microemulsion comprises a nonionic surfactant and a cationic surfactant;
   b. the pyrrolidone compound is N-methylpyrrolidone;
   c. the solvent extender comprises propylene glycol monomethyl ether and hexylene glycol;
   d. the cleaning composition has a flash point of at least about 105° F.; and
   e. the cleaning composition has a pH of about 6.0 to about 8.0.

* * * * *

UNITED STATES PATENT AND TRADEMARK OFFICE
CERTIFICATE OF CORRECTION

PATENT NO. : 6,071,867
DATED : June 6, 2000
INVENTOR(S) : Karen PURCELL et al.

It is certified that error appears in the above-indentified patent and that said Letters Patent is hereby corrected as shown below:

IN THE CLAIMS:

Claim 3, col. 12, line 32, "claim 2" should read --claim 1--.

Claim 8, col. 12, line 57, "claim 2" should read --claim 1--.

Claim 9, col. 12, line 60, "claim 2" should read --claim 1--.

Claim 10, col. 12, line 63, "claim 6" should read --claim 2--.

Claim 11, col. 12, line 66, "claim 7" should read --claim 3--.

Claim 14, col. 14, line 4, "claim 5" should read --claim 13--.

Claim 15, col. 14, line 12, "claim 5" should read --claim 13--.

Signed and Sealed this

Third Day of April, 2001

*Attest:*

NICHOLAS P. GODICI

*Attesting Officer*   *Acting Director of the United States Patent and Trademark Office*